United States Patent [19]

Pfeiffer

[11] Patent Number: 5,337,508
[45] Date of Patent: Aug. 16, 1994

[54] FISHING LURE AND METHOD

[76] Inventor: C. Boyd Pfeiffer, 14303 Robcaste Rd., Phoenix, Md. 21131

[21] Appl. No.: 89,348

[22] Filed: Jul. 12, 1993

[51] Int. Cl.$^5$ .............................................. A01K 85/00
[52] U.S. Cl. ................................... 43/42.03; 43/42.22
[58] Field of Search ............... 43/42.15, 42.22, 42.03, 43/42.11, 42.53, 45, 42.09

[56] References Cited

U.S. PATENT DOCUMENTS

| | | |
|---|---|---|
| 1,266,311 | 5/1918 | Phinney . |
| 1,997,900 | 4/1935 | Edwards ........................ 43/42.15 |
| 2,494,383 | 1/1950 | Gadzinski et al. ............. 43/42.22 |
| 2,608,016 | 8/1952 | Shipley ......................... 43/42.22 |
| 2,755,592 | 7/1956 | Bocchino ...................... 43/42.22 |
| 2,984,928 | 5/1961 | Jenkins, Sr. ................... 43/42.15 |
| 3,180,050 | 4/1965 | Shoemaker .................... 43/42.03 |
| 3,279,117 | 10/1966 | Weimer ......................... 43/42.03 |
| 3,367,057 | 2/1968 | Pond ............................. 43/42.11 |
| 3,815,275 | 6/1974 | Amundson ..................... 43/42.22 |
| 3,942,280 | 3/1976 | Ryder et al. .................. 43/42.22 |
| 4,006,551 | 2/1977 | Messacar ...................... 43/42.04 |
| 4,215,507 | 8/1980 | Russell ......................... 43/42.22 |
| 4,223,469 | 9/1980 | Luz .............................. 43/42.03 |
| 4,777,761 | 10/1988 | Renaud ......................... 43/42.03 |
| 4,807,387 | 2/1989 | Dougherty .................... 43/42.09 |

FOREIGN PATENT DOCUMENTS 750885 6/1956 United Kingdom ............. 43/42.22

Primary Examiner—P. Austin Bradley
Assistant Examiner—Jeanne M. Elpel
Attorney, Agent, or Firm—Charles M. Kaplan

[57] ABSTRACT

Various arrangements and methods of attaching motion producing vanes to the bodies of fishing lures enable the vanes to oscillate across the axis of the lures as the lures move through the water. This causes lures to have unique fish attracting motions that are not achievable by lures where the vanes are immovably attached to the lure bodies.

19 Claims, 2 Drawing Sheets

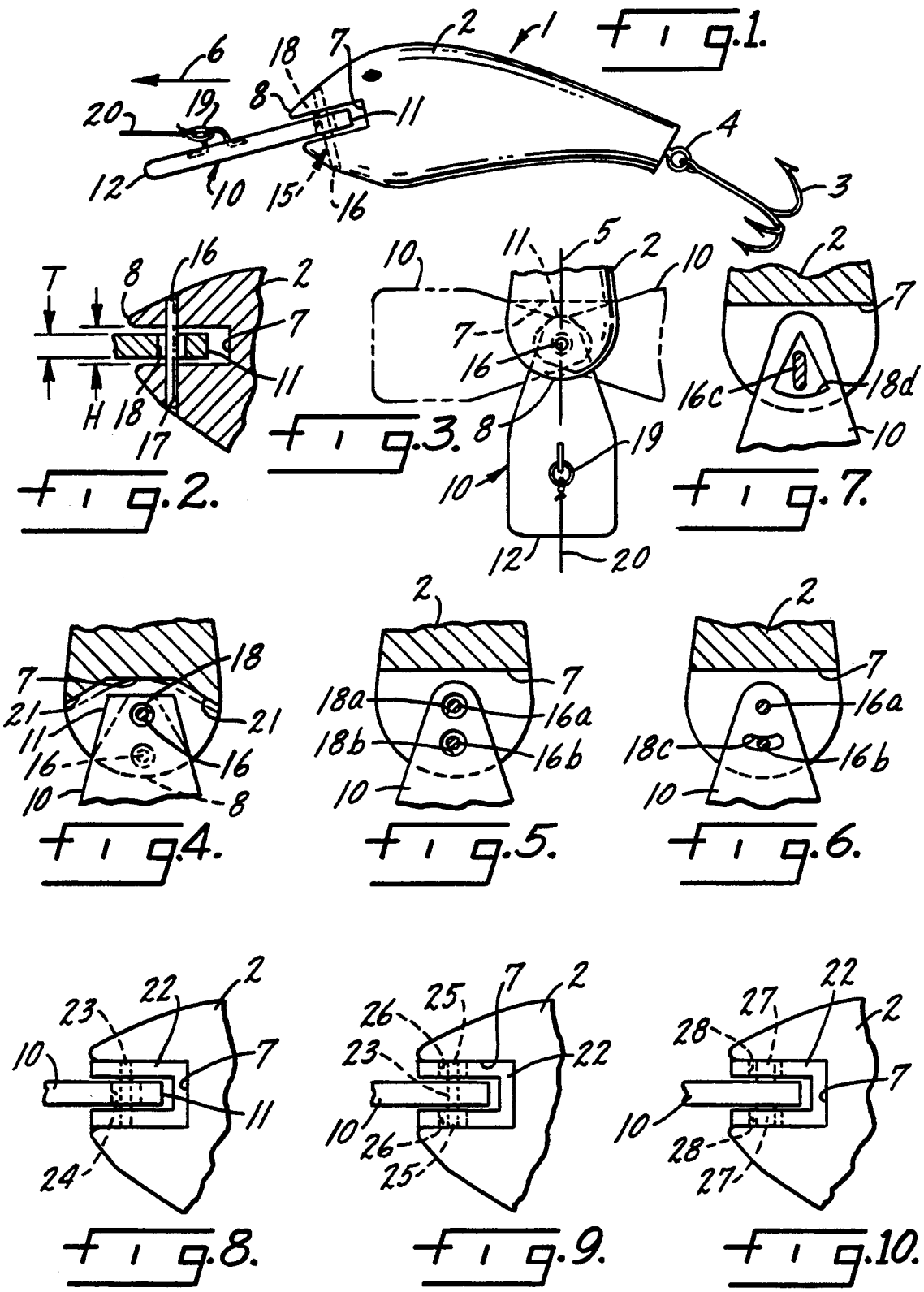

FISHING LURE AND METHOD

BACKGROUND OF THE INVENTION

This invention relates to fishing tackle and methods, and more particularly to fishing lures that have a vane, sometimes also referred to as a bill, lip or plate, extending from one end for producing motion and/or causing the lure to dive below the surface of the water when the lure is retreived or trolled. Although countless lures have employed such vanes, the vanes on prior lures have been held in fixed position with respect to the lure bodies when the lures move through the water. This prevents such lures from producing certain fish attracting motions.

OBJECTIVES OF THE INVENTION

Accordingly, it is an object of this invention to provide improved fishing methods, tackle and lures.

Another object is to provide fishing lures that have novel tail-wagging and wobbling action.

Another object is to mount a vane on a fishing lure in such a way that the movement of the vane itself can attract fish, and also makes the lure self-tuning.

A further object is to provide fishing lures with a vane that oscillates when the lure is moved through the water.

Another object is to provide fishing lures with a moveable vane that causes fish attracting vibrations, sound and reflections as the lure moves through the water.

An additional object is to provide fishing lures with a movable vane that can deflect weeds or other objects in the water that might otherwise become extangled with the lure.

Another object is to provide different arrangements for mounting a vane on a fishing lure body so that the vane oscillates when the lure moves through the water.

A still further object is to provide methods of creating new and different fish attracting motions of fishing lures, and methods of varying such motions.

Another object is to provide novel methods of movably mounting a vane on fishing lures.

Another object is to provide fishing lures that have novel fish atrracting motions, are simple to construct, snag resistant, durable, and which do not possess defects found in prior art lures.

Other objects and advantages of the invention will be found in the specification and claims, and the scope of the invention will be set forth in the claims.

DESCRIPTION OF THE DRAWING

FIG. 1 is a perspective view of a fish lure in accord with the teachings of this invention.

FIG. 2 is an enlarged cross sectional partial view of the lure of FIG. 1.

FIG. 3 is a partial top plan view of the lure of FIG. 1.

FIG. 4 is an enlarged cross sectional partial top plan view showing another embodiment of the invention.

FIG. 5 is an enlarged cross sectional partial top plan view of another embodiment of the invention.

FIG. 6 is an enlarged cross sectional partial top plan view of another embodiment of the invention.

FIG. 7 is an enlarged cross sectional partial top plan view of another embodiment of the invention.

FIG. 8 is an enlarged partial view of another embodiment of the invention.

FIG. 9 is an enlarged partial view of another embodiment of the invention.

FIG. 10 is an enlarged partial view of another embodiment of the invention.

DESCRIPTION OF THE INVENTION

Figure 11:
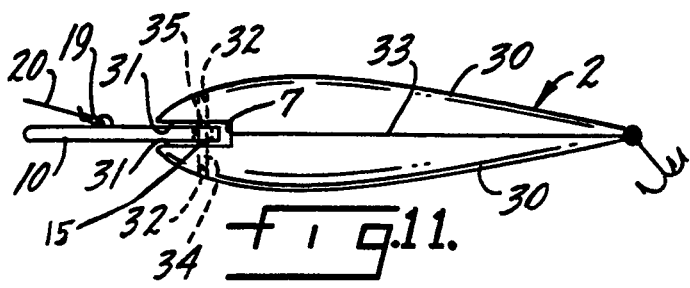
FIG. 11 is a side view of another embodiment of the invention.

The drawing shows a fishing lure 1 having a body 2 to which one or more hooks 3 may be attached by any conventional means, such as screw eyes 4. Body 2 has a central longitudinal axis 5 that extends in the general direction of movement of the lure indicated by the arrow 6 in FIG. 1. Body 2 has a slot 7 that may extend across the full width of its foreward or head end 8. Lure 1 includes a motion causing vane 10 having one end portion 11 that extends into slot 7 and another end portion 12 that protrudes from the slot ahead of body 2 in the direction the lure travels. As shown in FIG. 2, the thickness T of end portion 11 is less than the height H of slot 7 so that vane 10 is free to move in slot 7. The height of slot 7 and the thickness of end portion 11 should be substantially uniform. End portion 11 may be rounded as shown in FIG. 3 or straight as shown in FIG. 4.

Axle means 15 attaches vane 10 to body 2 in a manner that permits the vane to move with respect to the body. In FIGS. 1-3, the axle means comprises a cylindrical screw, pin or rod 16 having a predetermined diameter. The rod 16 passes through slot 7 and may be held in holes 17 in body 2 by an adhesive or by a friction fit. A hole 18 in end portion 11 receives rod 16 and has a predetermined diameter that is larger than the diameter of the rod, so that vane 10 is free to move in the slot.

Any conventional means, such as a split ring 19, that can be attached to vane 10 may be used to movably connect lure 1 to a fishing line 20. As the lure is drawn through the water, vane 10 will oscillate with respect to axis 5, as indicated in dotted lines in FIGS. 3. The vane 10 is free to oscillate up to ninety degrees on either side of axis 5 in FIG. 3 because slot 7 extends all the way across end 8 of body 2. In the FIG. 4 embodiment, slot 7 extends only part way across end 8; this limits the distance vane 10 can move before movement of the vane is stopped by contact with the sides 21 of the slot. Thus, the degree of oscillation of the vane 10 can be controlled or varied by changing the width of slot 7 with respect to the width of end 8 and the width of vane 10, or by changing the width of vane 10 with respect to the width of the slot. Also, as indicated in dotted lines in FIG. 4, the shape of the end portion 11 of vane 10, and/or the shape of slot 7, or the location of rod 16 can be changed so as to change the degree of oscillation of the vane. Such changes can cause the end 11 of the vane to impinge against rear surfaces or sides 21 within slot 7 or can cause the sides of vane 10 to impinge against the outer edges of the slot. Preferably, the width and shape of slot 7 and vane 10 and the location of rod 16 are predetermined so that vane 10 oscillates about forty-five degrees on either side of axis 5. The vane 10 can hit some part of lure 1 such as sides 21 with sufficient force to produce vibrations that are detectable by fish, and/or sounds that are audible to fish.

FIGS. 5-7 show additional embodiments in which oscillation of vane 10 can be varied and controlled without hitting the sides or edges of slot 7. In FIGS. 5 and 6 the degree of oscillation of the vane can be varied by changing the spacing between the rods 16a and 16b and by changing the relative diameter of the rods and holes 18a and 18b. In FIG. 6 the degree of oscillation of vane 10 can be varied by changing the spacing of rods 16a and 16b and by changing the curvature or length of the arcuate hole 18c. In the FIG. 7 embodiment, an elongated rod 16c is located in a pie-shaped hole 18d, and the degree of oscillation of vane 10 can be varied by changing the relative dimensions of the rod 16c and hole 18d. Also, the elongated rod 16c can be replaced by a pair of rods such as 16a and 16b. In the embodiments of FIGS. 5-7, the contact between the vane 10 and the rod or rods also produces fish attracting vibrations and/or sounds.

The body 2 and vane 10 may be made from any suitable material such as wood, plastic, metal or ceramic. When body 2 is made from a material such as wood or a ceramic that could split or fracture when the lure is in use, the slot 7 can be reinforced and strengthened. FIGS. 8-10 show slot reinforcing means that comprises a generally U-shaped insert 22 made from a strong plastic or metal. Insert 22 lines slot 7 and is bonded permanently in place. The FIG. 8 embodiment is like the embodiments of FIGS. 1-3 in that the axle means comprises a cylindrical rod 23 that passes through a hole 24 with a larger diameter in end portion 11 of vane 10. In all other respects the embodiment of FIG. 8 is the same as that of FIGS. 1-3. The embodiments of FIGS. 9 and 10 are the same as that of FIG. 8, except that the axle means is integral with vane 10 and extends into holes that have a larger diameter in the reinforcing insert 22. In FIG. 9 the axle means comprises a cylindrical rod 23 that is secured to vane 10; ends 25 of rod 23 extend above and below the opposite surfaces of vane 10 and are received in holes 26 in insert 22 that have a larger diameter. In FIG. 10 the axle means comprises a pair of aligned cylindrical projections or nibs 27 that are molded or otherwise formed as an integral part of vane 10 when the vane is manufactured. Nibs 27 project above and below vane 10 and are received in holes 28 in insert 22 that have a larger diameter. The embodiments of FIGS. 9 and 10 may be assembled by spreading the opposite sides or jaws of inserts 22 until the ends 25 or the nibs 27 can slide into holes 26 and 28, and then allowing the sides of insert 22 to snap back and capture their associated axle means. The inserts 22 can then be slid into the slots 7 and bonded in place. Inserts 22 can also be used with the embodiments of FIGS. 4-7 so that the degree of oscillation of vane 10 can be varied by changing the shapes and locations of the parts previously described.

Figure 12:
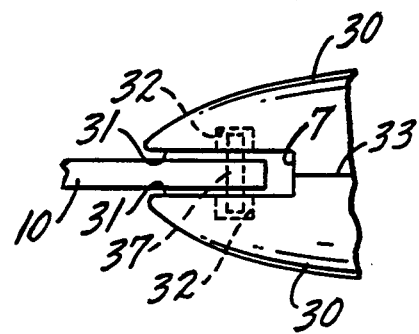
FIG. 12 is an enlarged partial side view of another embodiment of the invention.
Figure 13:
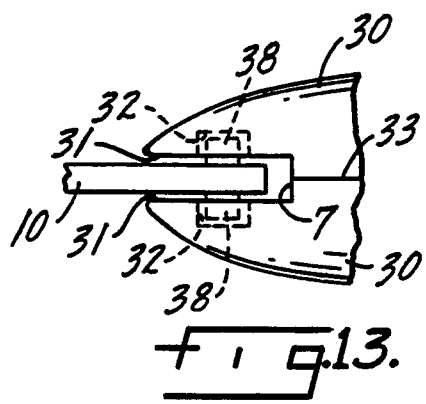
FIG. 13 is an enlarged partial side view of another embodiment of the invention.

FIGS. 11-13 show other embodiments of the invention in which body 2 is made from a pair of molded plastic body portions 30. Each body portion has a recessed ledge 31 adjacent its foreward end, and each ledge has a hole 32 for receiving axle means 15. Body portions 30 are joined along seams 33 in any conventional manner, such as by solvents or ultrasonic welding, to form the unitary lure body 2. When the body is assembled, ledges 31 are aligned to define slot 7 and holes 32 are aligned to receive the axle means. The embodiment of FIG. 11 is the same as the embodiments of FIGS. 1-3 in that the axle means comprises a cylindrical rod 34 which extends through a hole 35 in vane 10 having a larger diameter, and the ends of rod 34 are held in the holes 32 in body portions 30. The FIG. 12 embodiment is the same as the FIG. 9 embodiment in that the axle means comprises a rod 37 that passes through vane 10 and extends into the aligned holes 32 in ledges 31 that have a larger diameter than the rod. The FIG. 13 embodiment is the same as the FIG. 10 embodiment in that the axle means comprises a pair of aligned cylindrical nibs 38 that are formed as an integral part of vane 10, and the nibs 38 are received in aligned holes 32 in ledges 31 that have a larger diameter. The rods 34 and. 37 and nibs 38 would be placed in their respective holes 32 of the aligned body portions 30 of FIGS. 11-13 before the body portions are permanently joined to form the unitary body 2. In all other respects the embodiments of FIGS. 11-13 perform the same way as those previously described, and the expedients for controlling the degree of oscillation of vane described with reference to FIGS. 4-7 can also be employed with this embodiment.

Figure 14:
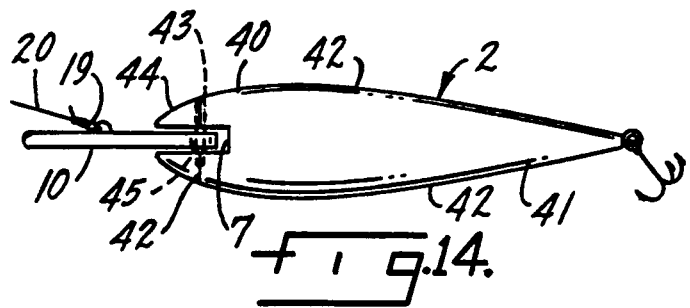
FIG. 14 is a side view of another embodiment of the invention.
Figure 15:
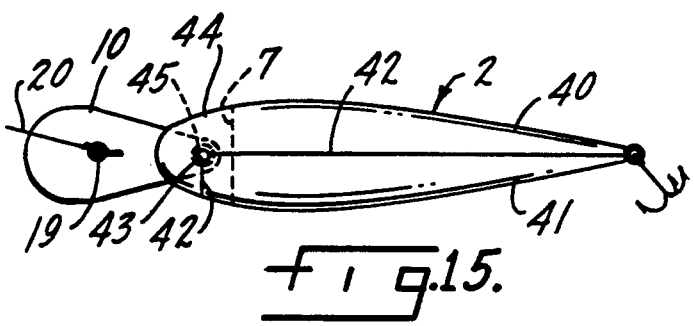
FIG. 15 is a top plan view of the embodiment of FIG. 14.

FIGS. 14 and 15 show another embodiment in which body 2 is made from molded plastic body portions 40 and 41. In this embodiment slot 7 is located in unitary head end 44 at the leading end of body portion 40 in order to increase the strength of the body adjacent the slot. The body portions are permanently joined along seam 42 to form a unitary body 2. Vane 10 may be held in place by axle means that is the same as that of FIGS. 1-3, in that a cylindrical rod 43 passes through slot 7 and through a hole 45 in vane 10 of larger diameter. In other respects, this embodiment is the same as those previously described, and the expedients for controlling the degree of oscillation of vane 10 described with reference to FIGS. 4-7 can also be employed with this embodiment.

Figure 16:
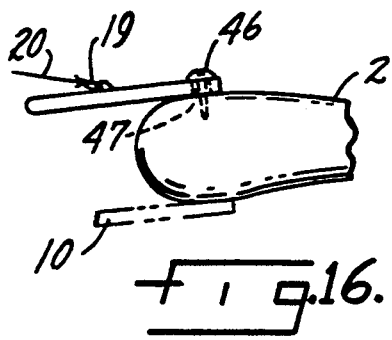
FIG. 16 is a partial side view of another embodiment of the invention.

FIG. 16 shows another embodiment in which the slot 7 is omitted. The vane 10 is attached to body 2 for oscillating movement, as previously described, by axle means, such as a headed cylindrical screw 46, that passes through an oversized hole 47 in the vane and then is threaded into the body. The vane 10 may be pivotally attached to body 2 either on its upper side as shown or on the underside as indicated in dotted lines. A pair of screws 46 in holes of varying sizes and locations may be used to vary the degree of oscillation of vane 10 and to produce vibrations or sound, as described with reference to FIGS. 5 and 6.

Figure 17:
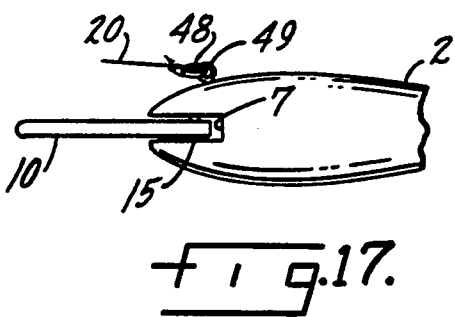
FIG. 17 is a partial side view of another embodiment of the invention.

FIG. 17 shows another embodiment that can be identical to any previously described embodiment except that the means for attached lure 1 to fishing line 20 is located somewhere other than on vane 10. In the example shown, line 20 is tied to a split ring 48 that may be attached to body 2 by a screw eye 49.

This invention also includes methods for causing a fish lure to have fish attracting motions and sounds by attaching vane 10 to body 2 so that the vane is free to move with respect to the body. Creating slot 7 in end 8 of body 2 provides a space for insertion of vane 10. Dimensioning the vane and slot so that the thickness T of vane is less than the height H of the slot, and providing a loose connection between the vane 10 and axle means 15 enables the vane to oscillate across the longitudinal axis 5 of the lure when the lure moves through water. The vane can be made to impact against some part of the lure, such as axle means 15 or slot 7, with sufficient force to produce vibrations and/or sounds that attract fish. The degree vane 10 oscillates and the amount of vibration or sound produced can be controlled and varied from one lure to another by using different width or shaped slots 7 or inserts 22 on different bodies 2; by using vanes 10 with end portions 11 of different width or shape; or by changing the number, location or shape of axle means 15 and the associated hole or holes in vane 10.

It has thus been shown that by the practice of this invention, fish lure bodies 2 can be given novel fish attracting wobbling movements by loosely mounting vanes 10 with or on axle means 15 in oversized slots 7. Also the wobbling action of bodies 2 and oscillating movement of vanes 10, relative to each other, produce unique fish attracting movements. The disclosed methods of attaching the vanes 10 permit the vanes to be of any size or length desired, and enable the vanes to extend from bodies 2 at any angle required to achieve the depth of dive desired for the lure. Vanes 10 can also be attached so that lures 1 swim at the water surface. The oscillating movement of vanes 10 causes vibrations, sound and light reflections in the water that can themselves be a source of fish attraction. In addition, as a vane 10 moves from side to side ahead of a lure body 2, the vane can deflect weeds or other snags before they reach the hooks 3 that trail the vane. The use of inserts 22 in slots 7 and the molding of slot 7 in unitary head end 44 makes lure 1 more durable by strengthening the slot in the area of greatest stress. Lures with vanes 10 mounted as described herein are self-tuning; this eliminates the requirement that the fisherman adjust the lure line tie in the field when a lure runs crooked. The lure body 2 and vane 10 can be of any size, shape, style or color desired, and the lure 1 can be fished by any desired method such as trolling, or casting and retrieving including cranking, jerking, twitching, jigging, and free fall.

While the invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A fishing lure comprising a body; a motion causing vane extending from said body; means for attaching said vane to said body in such a manner that said vane moves with respect to said body when said lure moves through water, said body having a slot adjacent one end, said vane having an end that extends into said slot and is movable in said slot, and a body reinforcing insert lining said slot, and said end of said vane being located within said insert.

2. The fishing lure defined in claim 1, wherein the attaching means comprises axle means within said insert.

3. The fishing lure defined in claim 1, wherein the attaching means comprises axle means that is secured to said vane so as to be movable therewith, said axle means extending past opposite surfaces of said vane, said insert having a pair of aligned holes of predetermined diameter, said axle means having a predetermined diameter smaller than said diameter of said holes, and said axle means extending into said holes so as to permit movement of said vane.

4. The fishing lure defined in claim 3, wherein said vane is made from plastic and said axle means is integral with said vane and comprises a pair of aligned nibs molded on opposite surfaces of said vane.

5. The method of creating sounds audible to fish with a fishing lure having a body with a central longitudinal axis, comprising the steps of:

A. attaching a fish lure motion producing vane to said body in such a manner that said vane will oscillate back and forth across said longitudinal axis into contact with some part of said lure within said slot with sufficient force to produce sounds audible to fish when said lure is in motion by:
1. creating a slot of predetermined height in said body adjacent one end of said body;
2. providing one end of said motion producing vane with a thickness that is less than said height of said slot;
3. inserting said one end of said vane into said slot;
4. extending another end of said vane beyond said slot ahead of said body;
5. attaching said vane to said body within said slot so as to cause said vane to oscillate into sound producing contact with said part of said lure within said slot when said lure moves through water; and
6. controlling the degree of oscillating movement of said vane by varying the relative size and shape of said slot and the size and shape of said one end of said vane;

B. connecting said lure to a fishing line; and

C. moving said lure through water so as to cause said vane to oscillate into sound producing contact with said part of said lure.

6. The method of creating sounds audible to fish defined in claim 5, further comprising causing said vane to produce said sounds by the oscillating contact of said one end of said vane with rear surfaces of said slot located within said slot.

7. The method of creating sounds audible to fish with a fishing lure having a body with a central longitudinal axis, comprising the steps of:

A. attaching a fish lure motion producing vane to said body in such a manner that said vane will oscillate back and forth across said longitudinal axis into contact with some part of said lure within said slot with sufficient force to produce sounds audible to fish when said lure is in motion by:
1. creating a slot of predetermined height in said body adjacent one end of said body;
2. providing one end of said motion producing vane with a thickness that is less than said height of said slot;
3. inserting said one end of said vane into said slot;
4. extending another end of said vane beyond said slot ahead of said body;
5. attaching said vane to said body within said slot so as to cause said vane to oscillate into sound producing contact with said part of said lure within said slot when said lure moves through water; and
6. attaching said vane to said body with vertical axle means passing through said vane, and controlling the degree of oscillating movement of said vane by varying the manner in which said axle means and said vane are connected to each other within said slot;

B. connecting said lure to a fishing line; and

C. moving said lure through water so as to cause said vane to oscillate into sound producing contact with said part of said lure.

8. The method of creating sounds audible to fish defined in claim 7, further comprising causing said vane to produce said sounds by oscillating into contact with said axle means used to attach said vane to said body within said slot.

9. A fishing lure comprising a plug body having a central longitudinal axis, said body having upper and lower opposed surfaces that define a slot adjacent one of its ends, said opposed surfaces being essentially flat and parallel, said slot having a predetermined uniform height; a motion causing vane having one end extending into said slot and another end end extending from said slot past said body, said one end of said vane having a predetermined uniform thickness that is less than said height of said slot, said one end of said vane having essentially flat parallel outer surfaces within said slot; and means for mounting said vane comprising means for connecting said lure to a fishing line and axle means in said slot for pivotally attaching said vane to said body in such a manner that said vane oscillates back and forth across said longitudinal axis as said lure moves through water, said axle means comprising vertical means in said slot passing through said opposed surfaces at said one end of said vane for controlling the extent to which said vane oscillates across said longitudinal axis.

10. The fishing lure defined in claim 9, wherein said means for mounting said vane is constructed and arranged so as to cause said vane to oscillate into contact with some part of said lure with sufficient force to produce sounds audible to fish as said vane moves across said longitudinal axis.

11. The fishing lure defined in claim 9, wherein said vertical means comprises a plurality of vertical pin means spaced from each other along said longitudinal axis.

12. The fishing lure defined in claim 9, wherein said vertical means comprises pin means passing through a pie wedge shaped hole in said vane.

13. The fishing lure defined in claim 9, wherein said means for mounting said vane is constructed and arranged so as to cause said vane to oscillate into contact with said vertical means with sufficient force to produce sounds audible to fish as said vane moves across said longitudinal axis.

14. A fishing lure comprising a plug body having a central longitudinal axis, said body having upper and lower opposed surfaces that define a slot adjacent one of its ends, said opposed surfaces being essentially flat and parallel, said slot having a predetermined uniform height; a motion causing vane having one end extending into said slot and another end extending from said slot past said body, said one end of said vane having a predetermined uniform thickness that is less than said height of said slot, said one end of said vane having essentially flat parallel outer surfaces within said slot; and means for mounting said vane comprising means for connecting said lure to a fishing line and axle means in said slot for pivotally attaching said vane to said body in such a manner that said vane oscillates back and forth across said longitudinal axis as said lure moves through water, and means for controlling the extent to which said vane oscillates across said longitudinal axis comprising said body having opposite sides that define rear surfaces within said slot, and said axle means being located in said slot so as to cause said one end of said vane to impinge against said rear surfaces within said slot and thereby to limit the extent of movement of said vane.

15. The fishing lure defined in claim 14, wherein said axle means and said rear surfaces within said slot and said one end of said vane are constructed and arranged so as to cause said one end of said vane to oscillate into contact with said rear surfaces of said slot with sufficient force to produce sounds audible to fish as said vane moves across said longitudinal axis.

16. A fishing lure comprising a plug body having a central longitudinal axis, said body having upper and lower opposed surfaces that define a slot adjacent one of its ends, said opposed surfaces being essentially flat and parallel, said slot having a predetermined uniform height, said plug body comprising a pair of plastic body portions, each body portion having a recessed ledge in its forward end, said body portions being joined along a horizontal seam into a unitary plug body with the ledges horizontally aligned and parallel so as to define said slot, and each of said ledges providing one of said opposed surfaces of said slot; a motion causing vane having one end extending into said slot and another end end extending from said slot past said body, said one end of said vane having a predetermined uniform thickness that is less than said height of said slot, said one end of said vane having essentially flat parallel outer surfaces within said slot; and means for mounting said vane comprising means for connecting said lure to a fishing line and axle means in said slot for pivotally attaching said vane to said body in such a manner that said vane oscillates back and forth across said longitudinal axis as said lure moves through water, said axle means comprising vertical means securely attached to said vane so that said vertical means oscillates with said vane, said vertical means being perpendicular to and extending away from each other past opposite surfaces of said vane, said body portions each having a hole of predetermined diameter in the ledge of such body portion, said holes being vertically aligned with each other when said body portions are joined into said unitary plug body, said vertical means having a predetermined diameter smaller than said diameter of said holes, and said vertical means extending into said holes holes for attaching said vane to said body so as to permit oscillating.

17. A fishing lure comprising a plug body having a central longitudinal axis, said body having upper and lower opposed surfaces that define a slot adjacent one of its ends, said opposed surfaces being essentially flat and parallel, said slot having a predetermined uniform height; a motion causing vane having one end extending into said slot and another end extending from said slot past said body, said one end of said vane having a predetermined uniform thickness that is less than said height of said slot, said one end of said vane having essentially flat parallel outer surfaces within said slot; and means for mounting said vane comprising means for connecting said lure to a fishing line and axle means in said slot for pivotally attaching said vane to said body in such a manner that said vane oscillates back and forth across said longitudinal axis as said lure moves through water, said axle means comprising a plurality of vertical pin means passing through said vane, said pin means being spaced from each other and aligned with each other along said longitudinal axis.

18. A fishing lure comprising a plug body having a central longitudinal axis, said body having upper and lower opposed surfaces that define a slot adjacent one of its ends, said opposed surfaces being essentially flat and parallel, said slot having a predetermined uniform height; a motion causing vane having one end extending into said slot and another end extending from said slot past said body, said one end of said vane having a predetermined uniform thickness that is less than said height of said slot, said one end of said vane having essentially flat parallel outer surfaces within said slot; and means for mounting said vane comprising means for connecting said lure to a fishing line and axle means in said slot for pivotally attaching said vane to said body in such a manner that said vane oscillates back and forth across said longitudinal axis as said lure moves through water, said axle means further comprising vertical pin means having a predetermined diameter securely attached to said one end of said vane so that said pin means oscillates with said vane, said pin means having opposite ends extending away from each other essentially perpendicularly to said vane beyond its upper and lower surfaces, there being a pair of vertically aligned holes in said upper and lower opposed surfaces of said slot, said holes being located generally above and below said longitudinal axis and being of larger diameter than said diameter of said vertical pin means, and said opposite ends of said pin means being received in said holes.

19. The fishing lure defined in claim 18, wherein said vane is made from plastic and said pin means comprises a pair of vertically aligned integral plastic nibs that extend away from each other from opposite surfaces of said vane essentially perpendicularly to said vane.

* * * * *

UNITED STATES PATENT AND TRADEMARK OFFICE
CERTIFICATE OF CORRECTION

PATENT NO.   : 5,337,508
DATED        : August 16, 1994
INVENTOR(S)  : C. Boyd Pfeiffer It is certified that error appears in the above-identified that said Letters Patent is hereby corrected as shown below:

Column 4, line 25, --10-- should be inserted after "vane"

Signed and Sealed this

Eighteenth Day of October, 1994

Attest:

BRUCE LEHMAN

*Attesting Officer*             *Commissioner of Patents and Trademarks*